July 17, 1934.   H. A. DENMIRE   1,966,541
TIRE BUILDING MACHINE
Filed Feb. 27, 1931   4 Sheets-Sheet 1

INVENTOR
Harold A. Denmire
BY Evans & McCoy
ATTORNEYS

July 17, 1934.  H. A. DENMIRE  1,966,541
TIRE BUILDING MACHINE
Filed Feb. 27, 1931  4 Sheets-Sheet 2

INVENTOR
Harold A. Denmire
BY Evans & McCoy
ATTORNEYS

July 17, 1934.    H. A. DENMIRE    1,966,541
TIRE BUILDING MACHINE
Filed Feb. 27, 1931    4 Sheets-Sheet 3

INVENTOR
Harold A. Denmire
BY Evans & McCoy
ATTORNEYS

July 17, 1934.   H. A. DENMIRE   1,966,541
TIRE BUILDING MACHINE
Filed Feb. 27, 1931   4 Sheets-Sheet 4

INVENTOR
Harold A. Denmire
BY Evans & McCoy
ATTORNEYS

Patented July 17, 1934

1,966,541

UNITED STATES PATENT OFFICE 1,966,541

TIRE BUILDING MACHINE

Harold A. Denmire, Akron, Ohio, assignor to The General Tire & Rubber Company, Akron, Ohio, a corporation of Ohio Application February 27, 1931, Serial No. 518,614

5 Claims. (Cl. 154—9)

This invention relates to tire building machines and more particularly to means for applying superposed plies of fabric to the periphery of the tire building core and for building bead rings into tire casings being formed on the core.

This invention has for an object to provide a tire building machine of simple, compact and rugged construction by means of which tire casings may be quickly and economically fabricated. A further object of the invention is to provide a convenient and effective means for pressing the tire fabric as it is delivered to the tire building core into conformity with the periphery of the core and for firmly uniting superimposed plies of fabric.

A further object is to provide means by which bead rings may be quickly and easily applied to a tire casing and by which the bead rings may be firmly united to the body of the tire casing.

With the above and other objects in view, the invention may be said to comprise the tire building machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
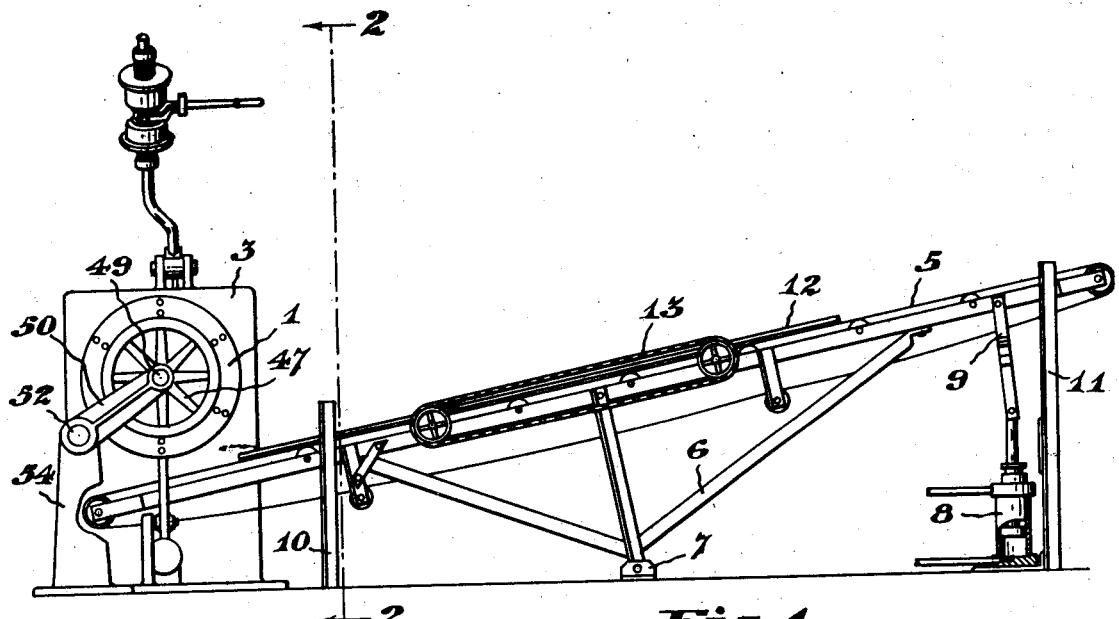
Figure 1 is a side elevation of the tire building machine embodying the invention.
Figure 2:
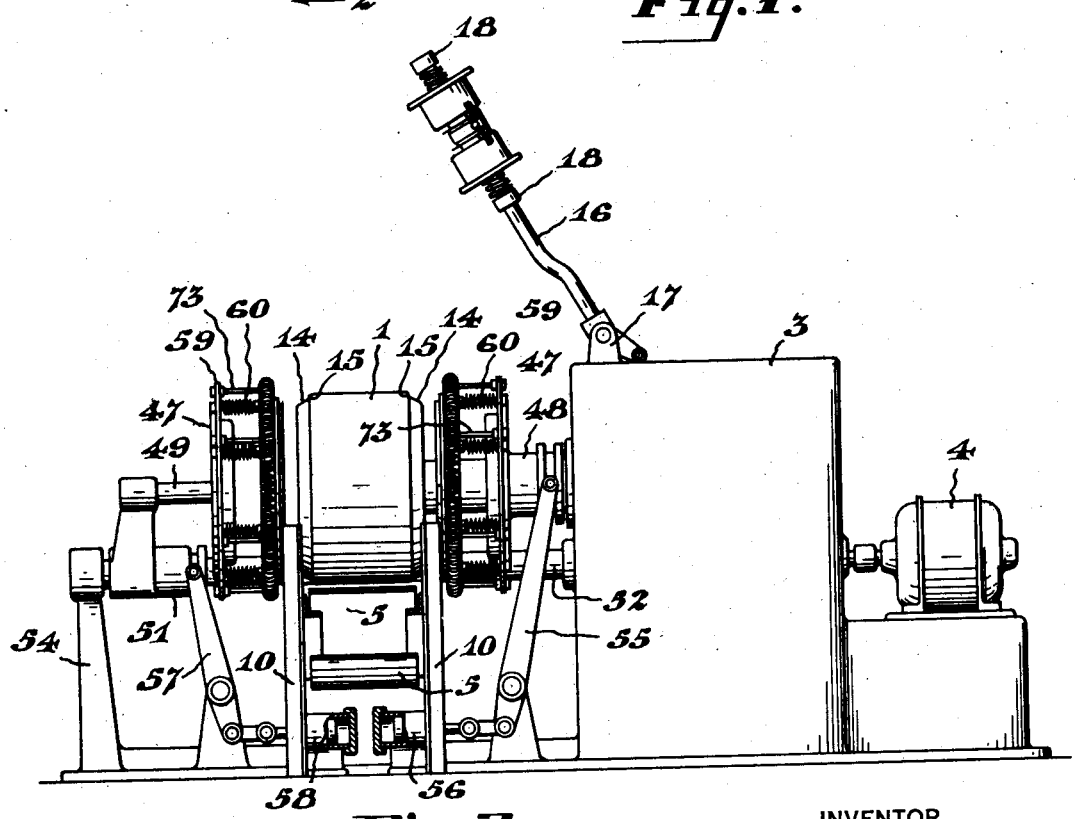
Fig. 2 is a section taken on the line indicated at 2—2 in Fig. 1.
Figure 3:
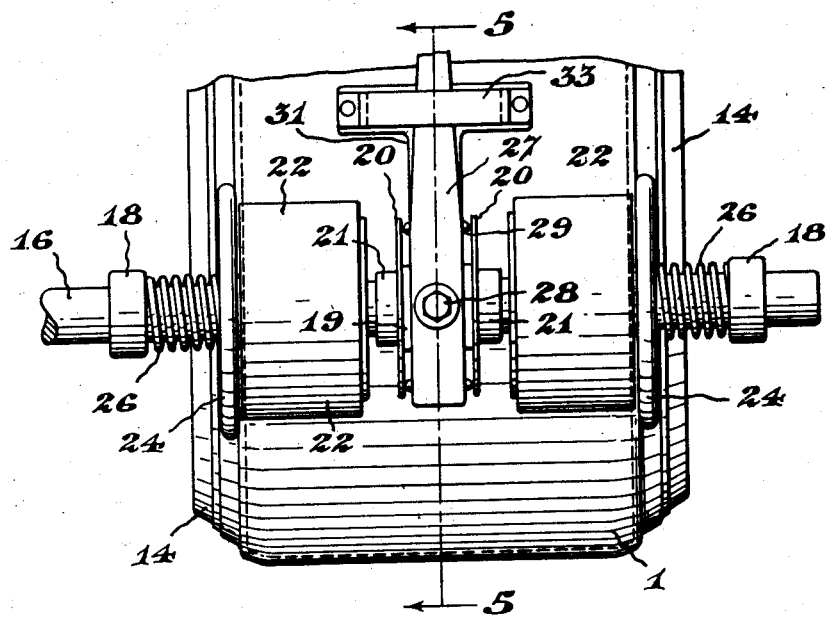
Fig. 3 is a fragmentary plan view showing stitching rollers for pressing the fabric plies into conformity with the periphery of the core and for firmly uniting superimposed plies of fabric.
Figure 4:
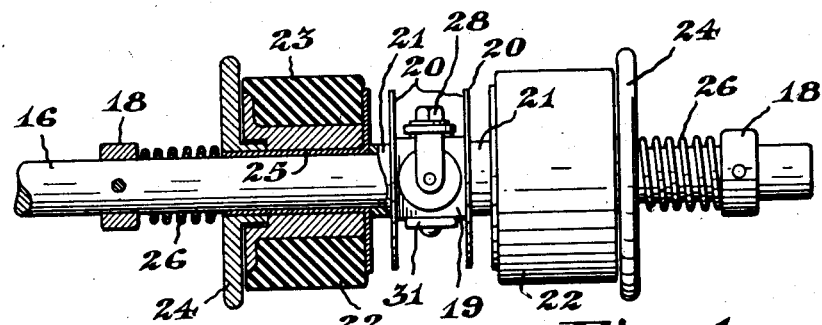
Fig. 4 is a detail view showing the stitching rollers, one of the rollers being shown in side elevation and the other in axial section.
Figure 5:
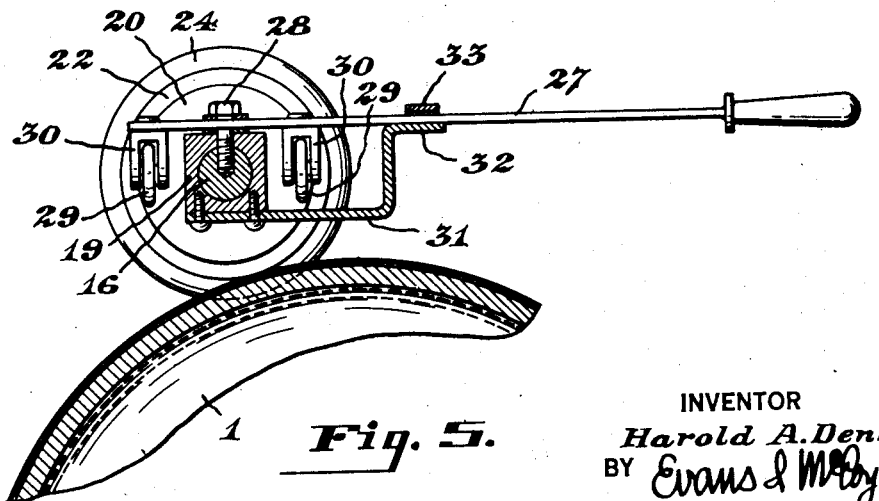
Fig. 5 is a fragmentary section taken on the line indicated at 5—5 in Fig. 3.

As shown in Figs. 1 and 2 of the drawings, the tire building machine includes a core 1 which preferably has the form of a cylindrical drum, upon which the tire casings are built, the core or drum 1 being preferably collapsible to facilitate removal of the tire casing therefrom.

The core 1 is fixed to a shaft 2 which projects outwardly from a suitable supporting frame or housing 3 and which may be driven by an electric motor 4 through suitable reduction gearing in the housing 3 to impart rotation to the drum 1.

Strips of rubber impregnated and coated tire fabric may be delivered to the drum 1 by means of a feed belt 5 which is mounted for movement into and out of engagement with the under side of the drum, so that it may be frictionally driven by the drum while in engagement therewith.

The belt 5 is supported upon a suitable truss frame 6 which is pivoted to a floor bracket 7, so that the forward end of the belt may be rocked into and out of engagement with the core 1. The feed belt 5 may be rocked about its pivot by means of a fluid pressure cylinder 8, the piston of which is connected by a pivoted yoke 9 to the conveyor frame adjacent the rear end thereof. In order to hold the feed belt in accurate alinement with the tire building core, front and rear guide standards 10 and 11 engage opposite sides of the frame 6. Suitable guide rails 12 may be mounted upon the frame 6 to overlap the sides of the belt 5 and these guide rails may be simultaneously adjusted by means of transverse screws which may be simultaneously actuated by a sprocket chain 13.

The core 1 is preferably cylindrical and is provided with continuous conical flanges 14 at opposite ends thereof which are offset radially inwardly from the cylindrical periphery of the core, to provide shoulders 15 between the conical flanges and the cylindrical periphery, against which bead rings may be pressed in applying bead rings to tire casings being built on the core.

In order to firmly secure superposed plies of fabric together and to press the fabric into conformity to the periphery of the core, suitable stitching devices are provided for engagement with the periphery of the core across the major portion thereof and particularly against the shoulders 15 and conical flanges 14 of the core.

As shown in Figs. 1 and 2 of the drawings, the stitching elements are carried by a shaft 16 pivoted to a bracket 17 on the frame 3 to swing about a horizontal axis disposed at right angles to the axis of the core 1 from a position directly over the core to a position clear of the core. The shaft 16 has spaced collars 18 pinned thereon and a collar 19 secured thereto midway between the collars 18. A pair of discs 20 are slidably mounted on the shaft 16, one on each side of the central collar 19 and these discs are provided with projecting hubs 21 which are engaged by the inner ends of stitching rollers 22. The rollers 22 are of cylindrical form and are provided with rubber treads 23 for engagement with fabric on the cylindrical portion of the core 1. At the outer end of each of the rollers 22, there is mounted a stitching disc 24 which is of somewhat greater diameter than the roller for engagement with the shoulder 15 and flange 14 of the core. The disc 24 and rollers 22 are preferably mounted for independent rotation on the shaft 16, the rollers and discs being mounted upon sleeves 25 which are rotatable on the shaft, the rollers 22 being rotatable on the sleeve and the disc 24 being rotatable with the sleeve. Each roller 22 and its associated disc 24 is pressed toward the central collar 19 by means of a coil spring 26 interposed between the disc 24 and the adjacent collar 18. The springs 26 normally hold the rollers 22 against the hubs 21 of the discs 20 and the discs 20 against the central collar 19. The distance between the discs 24 when they are held in their innermost positions by the springs 26 is somewhat less than the distance between the shoulders 15 of the core and means is provided for spreading the rollers and discs apart so that when the stitching rollers are lowered into engagement with the core, the discs 24 may be positioned outwardly of the shoulders 15 and so that upon release of the rollers and discs, the springs 26 will press the discs 24 against the shoulders 15 to stitch the portion of the fabric overlying the shoulders 15. For spreading the rollers apart, a lever 27 is pivoted to the top of the collar 19 to swing horizontally about a pivot 28 which may be a bolt which also serves to secure the collar 19 to the shaft 16. The lever 27 carries rollers 29 on opposite sides of the pivot 28 which are interposed between the discs 20, the rollers 29 being mounted in brackets 30 attached to the under side of the lever and being engageable with the discs 20 on opposite sides of the shaft 16. The lever 27 may be supported outwardly of the shaft 16 by means of a bracket 31 attached to the under side of the collar 19 and provided with a flange 32 upon which the lever 27 rests. A guide strap 33 is attached to the top of the flange 32 and extends across the top of the lever 27 providing stops for limiting the extent of angular movement of the lever. While the shaft 16 is being swung downwardly to core engaging position, the rollers 22 and discs 24 may be spread apart by means of the lever 27 and when the rollers are brought into engagement with the core, the lever 27 may be released, permitting the springs 26 to press the discs and rollers inwardly until the discs 24 come into engagement with the shoulders 15 of the core. As successive plies of fabric are delivered to the core, the rollers 22 and discs 24 press the outer ply of fabric against the surface of the drum and cause the outermost ply to firmly adhere to the ply of fabric beneath it with the superposed plies in engagement throughout the extent thereof and conforming to the periphery of the core.

Figure 6:
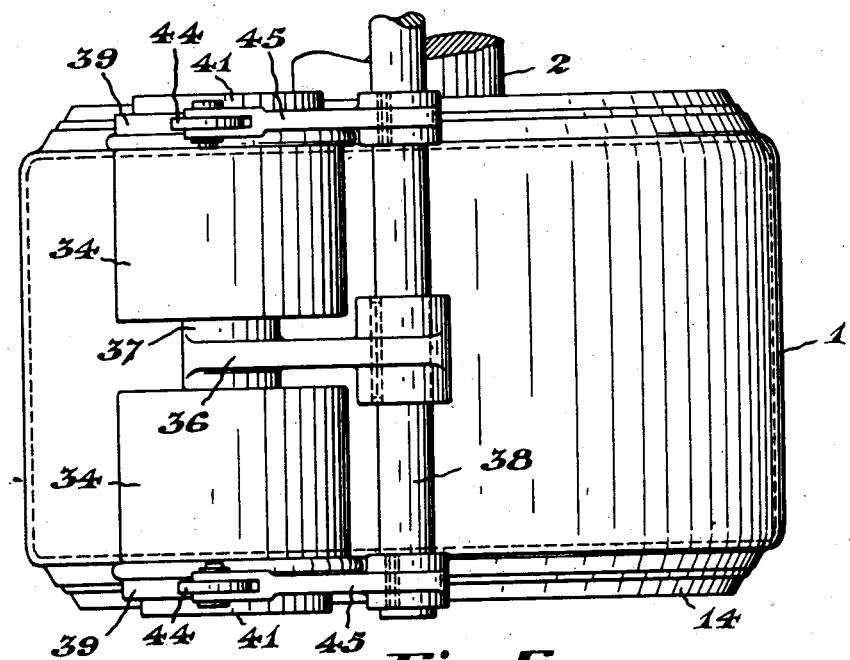
Fig. 6 is a plan view showing stitching rollers of a form slightly different from the rollers shown in Figs. 3, 4, and 5.
Figure 7:
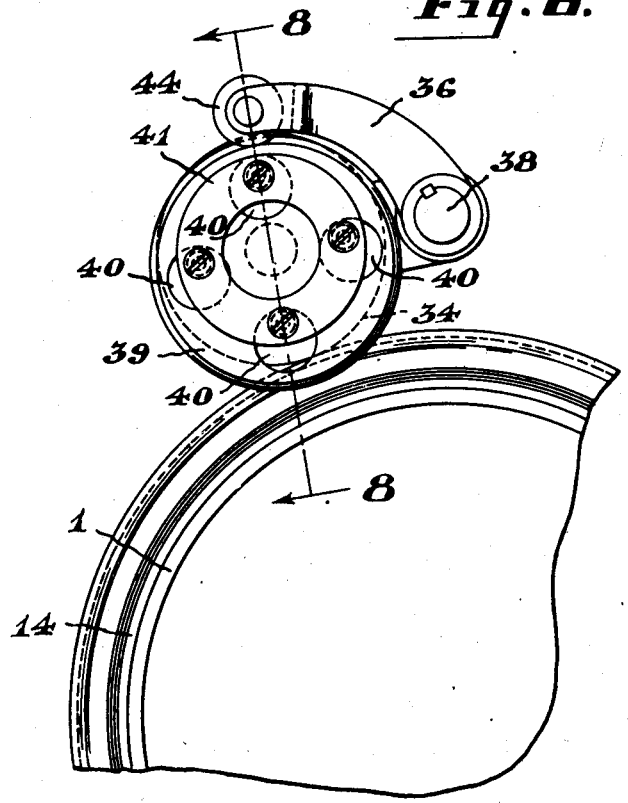
Fig. 7 is a fragmentary end elevation of the stitching rollers shown in Fig. 6.
Figure 8:
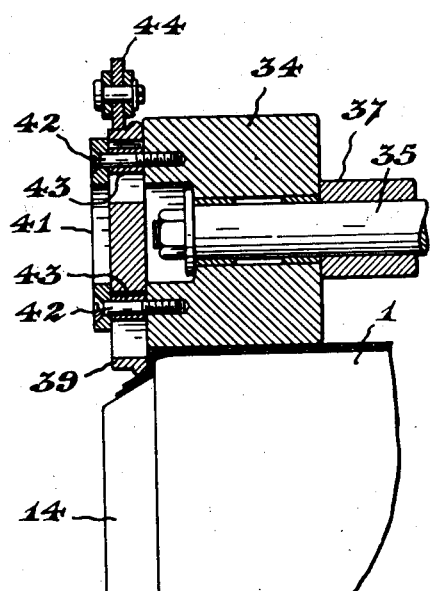
Fig. 8 is a section taken on the line indicated at 8—8 in Fig. 7.
Figure 9:
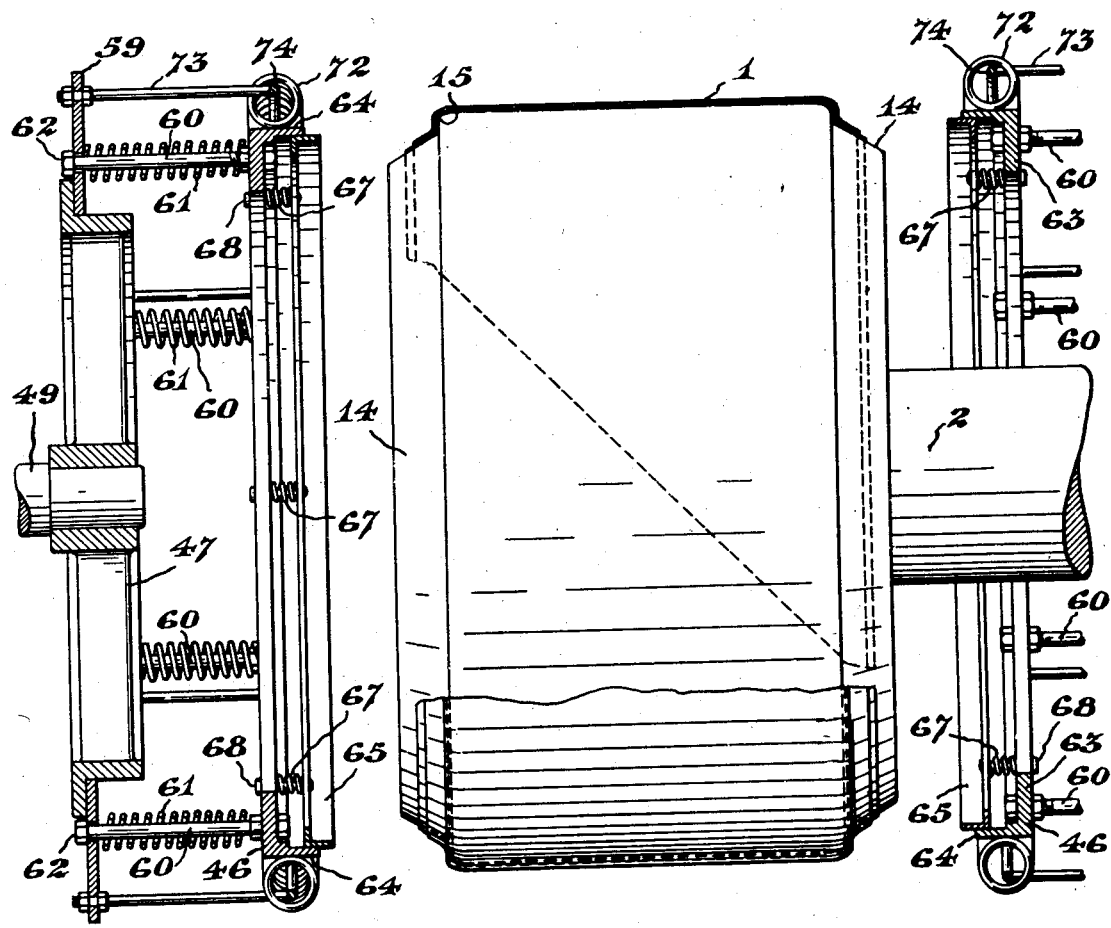
Fig. 9 is a sectional view showing the tire building drum and the associated bead placing rings.

A stitching means of somewhat different form is illustrated in Figs. 6, 7, and 8, which show stitching rollers 34 rotatably mounted on opposite ends of a shaft 35 which is carried by a supporting arm 36 which has a bearing portion 37 in which the central portion of the shaft 35 is secured, the arm 36 being fixed to a rock shaft 38 extending longitudinally over the top of the core 1.

The stitching rollers 34 are wide cylindrical rollers which engage with the cylindrical periphery of the core inwardly of the shoulders 15 and each roller 34 has attached thereto a shoulder stitching disc 39, which presses the fabric against a shoulder 15 and conical flange 14 of the core. The disc 39 has a series of uniformly spaced circular openings 40 between the periphery and center thereof, and each disc is secured to its roller 34 by means of a retaining ring 41, which is secured to the roller 34 by means of bolts 42 which extend through the openings 40 of the disc. The discs 39 are mounted for radial movements between the retaining rings 41 and the ends of the rollers 34, the rings 41 being held spaced from the ends of the rollers 334 by means of spacing sleeves 43 on the bolts 42, which are interposed between the rings and rollers. The spacing sleeves 42 are of a length very slightly greater than the thickness of the discs 39 and of a diameter less than that of the openings 40, so that the discs are free to move laterally between the retaining rings and rollers. During the stitching operation, the discs 39 are pressed downwardly toward the conical flanges 14 of the core 1 by means of pressure rollers 44 engaging the discs at the top thereof and carried by arms 45 attached to the shaft 38.

On opposite sides of the core 1, there are mounted bead placing rings 46 which are coaxial with the core and which are mounted for movement in an axial direction into and out of engagement with the core. The rings 46 at opposite ends of the core are carried by spiders 47 which are identical in construction, except that the spider between the core and the supporting housing 3 is carried by a hub 48 slidable on the shaft 2 of the drum, whereas the spider at the opposite side of the core 1 carried by a shaft 49 which is carried by the outer end of an arm 50 which is formed integrally with a sleeve 51 which is slidable on a shaft 52 supported rearwardly of the core 1 on the housing 3 and a standard 54 beyond the outer end of the core.

The sleeve 51 and arm 50 are normally held against angular movements, but the arm 50 may be swung laterally to move the bead placing ring to a position clear of the tire building core. The inner bead placing ring may be moved toward and away from the core 1 by means of a lever 55 which engages the hub 48 and which is actuated by a fluid pressure cylinder 56. The other bead placing ring may be moved toward and away from the core by means of a lever 57 engaging the sleeve 51, the lever 57 being actuated by a fluid pressure cylinder 58.

The spiders 47 have attached thereto flat annular discs 59 which serve as supports for the bead placing rings which are carried by guide rods 60 which are rigidly attached to the ring and which have a sliding fit in openings in the discs 59. Springs 61 surrounding the guide rods 60 and interposed between the rings 46 and discs 59 exert a spring pressure on the rings 46 normally holding the same in their outermost positions, the guide rods having heads 62 at their outer ends which engage the discs 59 and limit the inward movements of the ring.

Each of the rings 46 has a flat radial flange 63 and a cylindrical flanges 64 projecting inwardly toward the adjacent end of the drum. The cylindrical flange 64 provides a guide for an annular bead ring support 65 which has a cylindrical periphery forming a bead ring seat which has sliding fit within the flange 64. Guide rods 66 are attached to the bead ring support 65 and slide in openings in the flange 63. Springs 67 surrounding the rods 66 are interposed between the flange 63 and the supporting annulus 65 which exerts an outward pressure on the supporting annulus, the outward movement of the annulus being limited by heads 68 on the ends of the guide rods 66.

In the operation of the machine, strips of fabric are fed by the belt 5 under the periphery of the core 1 and superposed layers of fabric are stitched together and molded into conformity with the periphery of the core by means of the stitching rollers and stitching discs. The marginal edges of the fabric strips are forced down into conformity with the shoulders 15 and end flanges 14 of the core by means of the stitching discs, while the central portions of the fabric strips are being pressed against the cylindrical periphery of the drum by means of the stitching rollers.

Figure 12:
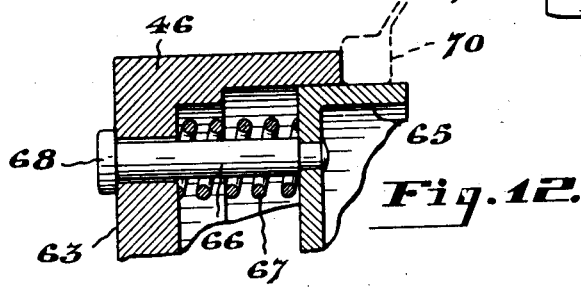
Fig. 12 is a sectional view on an enlarged scale showing the bead ring supporting portion of the bead placing ring.

As shown in Fig. 12 of the drawings, a bead ring 70 may be positioned on each of the two supporting rings 65 which are held by the springs 67 in positions in which they project beyond the inner edges of the flanges 64 of the bead placing ring. The bead ring 70 may be placed upon the supporting ring 65 prior to the delivery of the fabric to the drum 1 or these rings may be built up upon the supporting rings 65. The bead rings are provided with the usual fabric flipper strip 71 and means is provided for firmly uniting the flipper strip 71 with the layers of fabric which have been built up on the core 1. To accomplish this result, each of the spiders 46 carries a stitching annulus in the form of a coil spring 72 which is carried by supporting rods 73 which are fixed to the discs 59 outwardly of the guide rods 60. The rods 73 are rigidly attached to the discs 79 and the stitching annulus 72 is loosely supported at the outer end of the rods 73 which have laterally bent ends 74 which engage within coils of the spring.

Figure 11:
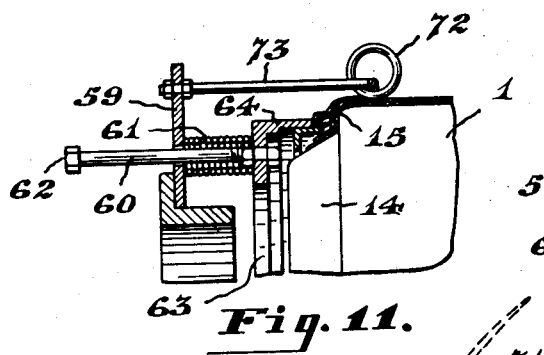
Fig. 11 is a view similar to Fig. 10, showing the stitching annulus carried by the bead placing device, moved into engagement with the periphery of the drum.
Figure 10:
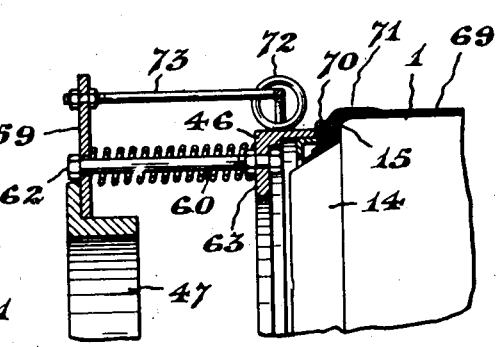
Fig. 10 is a fragmentary sectional view showing the bead placing ring in engagement with the drum.

As shown in Figs. 10 and 11 of the drawings, the bead rings 70 are brought into engagement with the fabric on the core overlying the shoulders 15 thereof by moving the spiders 46 inwardly toward the end of the core. When a bead placing ring is pressed against an end of the core, the bead ring supports 65 are moved into the rings 46 against the tension of the springs 67 and the bead ring 70 is pressed against the fabric overlying the shoulders 15 of the drum, by the inner edge of the ring 46.

Further movement of a spider 47 toward an end of the core causes the springs 61 to be compressed, increasing the pressure of the ring 46 on the bead ring 70 as the spider 47 moves bodily toward the end of the core. This movement of the spider causes the stitching annulus 72 which is normally held by its spring tension to a diameter less than the peripheral diameter of the core to roll over the shoulders 15 and firmly press the flipper strips 71 into engagement with the fabric on the drum throughout the periphery thereof.

If desired, either of the spiders 47 may be given a reciprocating motion to move the spring stitching annulus 72 back and forth across the shoulder of the drum as many times as desired.

After the flipper strip has been stitched through the body of the tire casing, the projecting edges of the fabric strips which lie on the conical flange 14 of the drum may be bent up around the bead ring and may be stitched thereto by means of the spring annulus 72.

In the operation of the machine, strips of bias cut fabric are placed on the feed belt 5 and delivered to the core 1 with their ends abutting edge to edge. As the bias cut strips are brought into engagement with the core, they adhere to the surface of the core or to the surface of fabric strips previously fed to the core and are carried around beneath the stitching rollers which press the fabric into conformity with the periphery of the core and force the marginal portion of the fabric over the shoulders 15 and into engagement with the conical flanges 14. After a suitable number of layers of fabric have been applied to the core, the spiders 47 are actuated to move the bead placing rings into engagement with the ends of the core to place the bead rings 70 in engagement with the fabric overlying the shoulders of the core. The inward movement of the spiders 47 not only applies the bead ring to the core, but also moves the stitching coils 72 across the ends of the core stitching the flipper strips 71 to the fabric on the core.

It will be apparent that by delivering the fabric to the core by means of a feed belt, the layers of fabric may be very rapidly built up upon the core, after which the bead rings may be applied by a single stroke of the bead applying devices, so that the entire tire casing may be built in a very short time.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a tire building machine, a tire building core having peripheral shoulders at opposite ends thereof upon which the bead ring receiving portions of a tire casing are formed, a bead placing ring mounted coaxially with the core and for movement axially toward and from an end thereof, said bead placing ring having means for pressing a bead ring thereon against a shoulder of the core, and a stitching annulus mounted for movement axially of the core and over the bead placing ring and across the shoulder of the drum to stitch a flipper strip carried by the bead ring to the body of a tire casing on the core.

2. In a tire building machine, the combination with a tire building core having peripheral shoulders at opposite ends thereof upon which the bead ring receiving portions of a tire casing are formed, of means spaced laterally of the core for supporting a bead ring coaxial with the core and for pressing said ring against the shoulder of the core, and means mounted for movement in an axial direction with respect to the core and bead placing ring from the outer side of the ring across the shoulder of the core for stitching the bead ring flipper strip to the body of a tire casing on the core.

3. In a tire building machine, the combination with a tire building core having peripheral shoulders at opposite ends thereof upon which the bead ring receiving portions of a tire casing are formed, of means spaced laterally of the core for supporting a bead ring coaxial with the core and for pressing said ring against the shoulder of the core, and means mounted for movement in an axial direction with respect to the core and bead placing ring from the outer side of the ring across the shoulder of the core for stitching the bead ring flipper strip to the body of a tire casing on the core, said stitching means comprising a coil spring annulus which is normally of a diameter less than that of the core adjacent the shoulder thereof.

4. In a tire building machine, the combination with a tire building core having peripheral shoulders at opposite ends thereof upon which the bead ring receiving portions of a tire casing are formed, of a bead ring applying means comprising a supporting member spaced laterally of the core for movement axially toward and away from an end of the core, a bead ring supporting annulus interposed between said supporting member and core, said annulus being coaxial with the core and slidably mounted on said supporting member for axial movement with respect thereto, a stitching annulus carried by said supporting member, said stitching annulus being of greater diameter than said bead ring supporting annulus and concentric therewith, and means for actuating said bead ring applying means to press the bead ring supporting annulus against the shoulder of the core and to move the stitching annulus across the shoulder of the core.

5. In a tire building machine, the combination with a tire building core having peripheral shoulders at opposite ends thereof upon which the bead ring receiving portions of a tire casing are formed, of a bead ring applying means comprising a supporting member spaced laterally of the core for movement axially toward and away from an end of the core, a bead ring supporting annulus interposed between said supporting member and core, said annulus being coaxial with the core and slidably mounted on said supporting member for axial movement with respect thereto, means for supporting the bead ring annulus comprising guide rods slidable in the supporting members, coil springs on the guide rods between the supporting member and annulus, supporting rods fixed to the supporting member outwardly of said guide rods, and a stitching annulus in the form of a coil spring supported on the ends of said supporting rods.

HAROLD A. DENMIRE.